United States Patent [19]

Nakama

[11] Patent Number: 4,547,108
[45] Date of Patent: Oct. 15, 1985

[54] TRIM COVER CLIP

[75] Inventor: Daiji Nakama, Chigasaki, Japan

[73] Assignee: Nifco Inc., Yokohama, Japan

[21] Appl. No.: 555,120

[22] Filed: Nov. 25, 1983

[51] Int. Cl.[4] .............................................. F16B 19/00
[52] U.S. Cl. ....................................... 411/374; 411/508
[58] Field of Search ............... 411/374, 182, 500, 508, 411/436, 437, 548, 907, 277, 280, 281, 283, 284; 24/297, 290

[56] References Cited

U.S. PATENT DOCUMENTS

| 2,401,672 | 6/1946 | Tinnerman | 411/437 |
| 2,580,745 | 1/1952 | Engstrom | 411/280 |
| 3,433,119 | 3/1969 | Ballantyne | 411/437 |
| 3,449,799 | 6/1969 | Bien | 411/437 X |
| 4,263,833 | 4/1981 | Loudin | 411/60 |
| 4,299,520 | 11/1981 | Iwata | 411/437 |
| 4,435,111 | 3/1984 | Mizusawa | 411/21 X |

FOREIGN PATENT DOCUMENTS

| 487622 | 4/1918 | France | 411/437 |
| 912009 | 4/1946 | France | 411/437 |
| 178763 | 4/1922 | United Kingdom | 411/437 |
| 1013219 | 12/1965 | United Kingdom | 411/60 |

OTHER PUBLICATIONS

M. Henry, "Push-On Nut," Aug. 1977, vol. 20, No. 3, *IBM Technical Disclosure Bulletin*.

*Primary Examiner*—Kenneth J. Dorner
*Assistant Examiner*—Adrian H. Whitcomb, Jr.
*Attorney, Agent, or Firm*—J. R. Halvorsen; T. W. Buckman

[57] ABSTRACT

A trim cover clip comprising a hollow tube made of a plastic substance, containing in the wall of the hollow tube at least one slit having the shape of three sides of a rectangle and thereby enclosing therein an engaging piece possessing a free end, and having the inner wall of the engaging piece corrugated to form teeth capable of engaging with the thread on the bolt being passed through the inner hole of the hollow tube is improved by having the engaging piece formed aslant inwardly enough for the free end thereof to thrust deeply into the inner wall of the hollow tube.

3 Claims, 9 Drawing Figures

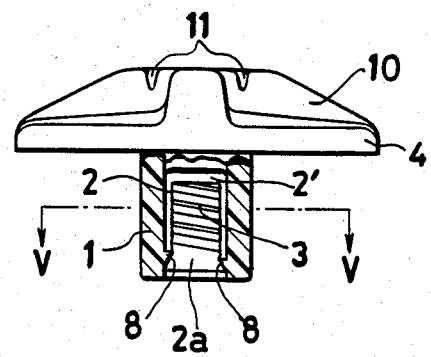
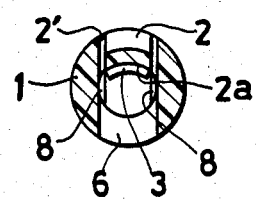
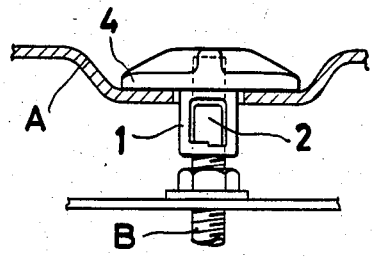
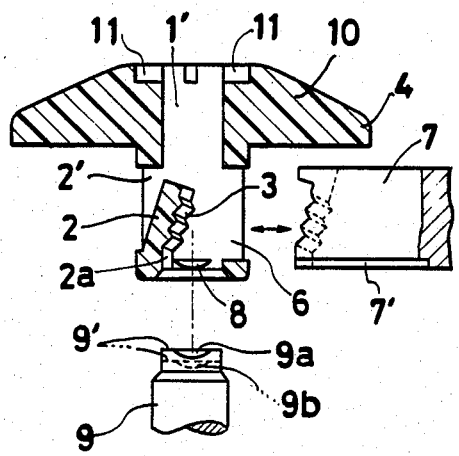
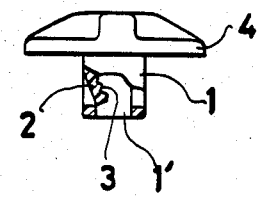
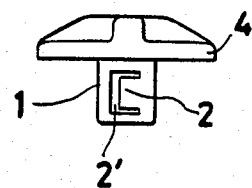

TRIM COVER CLIP

BACKGROUND OF THE INVENTION

This invention relates to a thread retainer, otherwise commonly called a trim cover clip, which is made of a plastic substance and adapted to fasten a panel or some other similar object readily and detachably to a bolt having a male thread formed on the periphery thereof (hereinafter referred to as a "trim cover clip").

Attachment of this trim cover clip to a given bolt is accomplished by passing the bolt through the object until the leading end thereof protrudes from the object and pushing the trim cover clip in the axial direction onto the protruding end of the bolt. Detachment of the trim cover clip from the bolt is effected by turning the trim cover clip in the loosening direction of the thread in the same manner as a nut is unfastened from a bolt.

As can be seen from, for example, the prior art trim cover clip described in Japanese Utility Model Application Disclosure Sho 57(1982)-21815, the thread on the bolt is generally in the shape of a helical ridge so that when this bolt is passed through the object and a conventional trim cover clip is pushed in the axial direction onto the protruding leading end of the bolt to fasten the object to the bolt, the rack teeth of the trim cover clip come into engagement only in a limited part with the male thread on the bolt because these teeth have straight ridges running perpendicularly relative to the axial direction of the bolt and these ridges differ in shape from the helical ridge of the male thread on the bolt. Thus, the trim cover clip has an advantage that, during its attachment to the bolt, it can be pushed in with nominal force and, at the same time, suffers from a disadvantage that it can retain the object only weakly. When the conventional trim cover clip is used in attaching a finisher of an automobile trunk, for example, it will come loose on exposure to vibrations or other similar external impacts.

SUMMARY OF THE INVENTION

An object of this invention is to provide a trim cover clip which, during attachment to the bolt, requires fairly large force but, after completion of the attachment, keeps the object fastened to the bolt very powerfully with no possibility of it coming loose.

To accomplish the object described above according to the present invention, there is provided a trim cover clip comprising a hollow tube made of a plastic substance, containing in the wall of the hollow tube at least one slit having the shape of three sides of a rectangle and thereby enclosing therein an engaging piece possessing a free end, and having the inner wall of the engaging piece corrugated to form teeth capable of engaging with the thread on the bolt being passed through the inner hole of the hollow tube, which trim cover clip is characterized by having the engaging piece formed inwardly aslant relative to the outer wall of the hollow tube so that the free end thereof may thrust deeply into the inner hole of the tube.

Since the free ends of the engaging pieces are projected aslant into the inner hole of the hollow tube as described above, they are pressed against the lateral wall of the bolt because of the resiliency of the engaging pieces. When this trim cover clip is pushed onto the bolt to fasten a given object thereto, therefore, it is prevented from being rotated in its loosening direction.

The other objects and characteristic features of this invention will become apparent to those skilled in the art as the further disclosure is made in the following description with reference to the accompanying drawing.

BRIEF EXPLANATION OF THE DRAWINGS

FIG. 4 is a front view of a trim cover clip of this invention, with the essential part thereof illustrated in cross section.

FIG. 5 is a cross section taken along the line V—V of FIG. 4.

FIG. 6 is a longitudinally sectioned side view of the trim cover clip of FIG. 4.

FIG. 7 is an explanatory view of the trim cover clip of this invention as held in the state of actual use.

FIG. 8 is a partially sectioned side view of another trim cover clip of this invention.

FIG. 9 is a front view of yet another trim cover clip of this invention.

DESCRIPTION OF PREFERRED EMBODIMENTS

Figure 1:
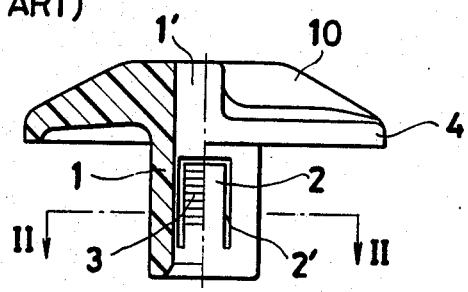
FIG. 1 is a half-sectioned front view of a conventional trim cover clip.
Figure 2:
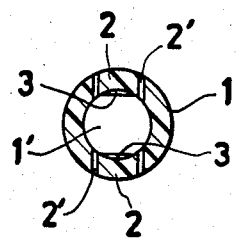
FIG. 2 is a cross section taken along the line II—II of FIG. 1.
Figure 3:
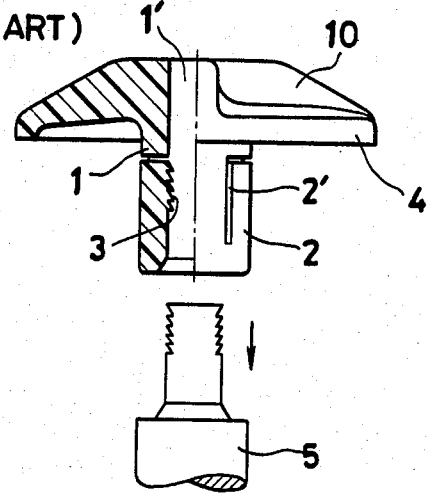
FIG. 3 is a half-sectioned side view of the trim cover clip of FIG. 1.

FIGS. 1-3 illustrate a conventional trim cover clip. This trim cover clip comprises a tube 1 of a plastic substance having an inner hole of a slightly larger diameter than the ridge of the thread on the bolt. In the wall of the hollow tube 1, at least one engaging piece 2 of the shape of a tongue is formed as enclosed in a slit 2' of the shape of three sides of a rectangle. The engaging piece 2 is provided on the inner wall thereof with rack teeth 3 projecting shallowly into the inner hole 1' of the hollow tube slightly past the inner wall of the inner hole 1'. When necessary, a piece 4 such as a flange or an arm intended to hold down the upper surface of the object is provided to extend from the top of the periphery of the hollow tube. The rack teeth 3 are given a cross section of the shape of saw teeth or check claws so that a core 5 used for forming the inner hole 1' during the molding of the hollow tube 1 may be safely drawn out in the axial direction. Further, they are straight teeth running perpendicularly relative to the axial direction of the inner hole 1'.

On the other hand, the thread formed on the bolt is generally in the shape of a helical ridge. When this bolt is passed through the object and the conventional trim cover clip is pushed in the axial direction onto the leading end of the bolt thrust out of the object to fasten the object to the bolt, the rack teeth are engaged only in a greatly limited part with the thread on the bolt because the rack teeth differ in cross section from the thread and further because they are straight. Besides, the engaging piece 2 is enclosed on three sides with a slit 2' and, therefore, is allowed to have its free end pushed outwardly. Thus, the trim cover clip suffers from the disadvantage that it can keep the object fastened only weakly, though it enjoys the advantage that it can be attached to the bolt with nominal force. When it is used for attaching a finisher of an automobile trunk, for example, there may ensue the possibility that the clip will come loose on exposure to vibrations or other external inpacts.

FIGS. 4–7 illustrate a trim cover clip as the first embodiment of this invention. In a tube 1 of a plastic substance, one engaging piece 2 is formed by cutting in the wall of the tube a slit 2' in the shape of three sides of a rectangle. This engaging piece 2 is formed aslant inwardly relative to the outer wall of the hollow tube so that the free end thereof will deeply thrust into an inner hole 1' of the tube. Further, the inner wall 2a of the engaging piece 2 is curved at roughly the same curvature as the inner wall of the inner hole 1' and teeth 3 are helically shaped at the same pitch as the thread on the bolt "B" (FIG. 7). Moreover, the teeth conform in cross section with the thread on the bolt.

Formation of the engaging piece 2 of the trim cover clip in the construction described above is accomplished by having a window hole 6 formed in the wall of the hollow tube 1 at a position opposed to the engaging piece 2, inserting a core designed to give required inner wall and teeth to the engaging piece through this window hole preparatory to the molding, and removing the core through the window hole after completion of the molding. In other words, for the purpose of forming the engaging piece 2 in the construction described above, the window hole 6 is necessarily formed in the wall of the hollow tube to permit insertion and withdrawal of the core.

In the trim cover clip of this invention, since the engaging piece 2 is slanted inwardly enough for its free end to thrust deeply into the inner hole 1', the bolt "B" while being driven into the inner hole 1' is required to push the engaging piece 2 into an upright position falling substantially completely in the wall of the hollow tube by overcoming the resiliency exerted by the engaging piece. Thus, the insertion of the bolt "B" in this trim cover clip requires considerably greater force than the conventional trim cover clip. Once the bolt "B" is driven home into the hollow tube to complete the attachment of the object, the engaging piece 2 presses the lateral wall of the bolt with its resiliency. The inner wall 2a of the engaging piece 2 is curved inwardly in an arc and the teeth 3 are helically cut. Moreover, these teeth agree in cross section to the thread on the bolt and they are meshed snugly with the thread of the bolt. Thus, the trim cover clip of this invention can fasten the object "A" as powerfully as when a nut is screwed helically around a bolt and secured threeon. FIG. 7 illustrates the trim cover clip of this invention as held in a state fastening a finisher of an automobile trunk to the bolt "B".

Simpler embodiments of the invention than the optimal embodiment illustrated in FIGS. 4–6 are also possible. More specifically, insofar as the engaging piece 2 is inwardly slanted enough for its free end to be thrust deeply into the inner hole of the hollow tube, the inner wall of the engaging piece 2 need not be curved inwardly in an arc or the teeth 3 need not be cut in the cross section of a ridge but may be formed in the shape of straight rack teeth as in the conventional trim cover clip.

Optionally, one or more protuberances 8 thrust shallowly into the inner hole of the hollow tube may be raised, so that they will cooperate with the teeth of the engaging piece in meshing with the thread on the bolt. In the illustrated embodiment, such protuberances 8 are formed between the lower faces of the opposed sides of a mold 7 and the upper lateral faces of a lower core 9 having the upper end thereof colliding with the lower face of the mold 7 to form the lower inner face of the tube. The protuberances 8, therefore, are opposed to each other as separated by 90° each in the circumferential direction from the engaging piece 2 and deviated by one half the pitch of the thread on the bolt in the axial direction. Formation of protuberances 8 in the manner described above is accomplished by providing for the mold 7 a step 7' adapted to deviate the lower surface of the mold 7 by one-half pitch and similarly providing the upper portion of the lower core 9 with a step 9' and, at the same time, forming on a higher level and a lower level nail-shaped notches 9a, 9b having an upper opening at opposite lateral portions of the core 9.

In the embodiment described so far, the engaging piece 2 is formed so as to be slanted upwardly relative to the hollow tube 1. Optionally, the engaging piece 2 may be formed so that the free end thereof will be slanted downwardly relative to the hollow tube as illustrated in FIG. 8 or the free end thereof will be slanted in one circumferential direction of the hollow tube 1 as illustrated in FIG. 9. For practical use, a raised strip 10 adapted to be nipped with finger tips during separation of the clip from the bolt may be formed on a flange 4 or a groove 11 adapted to admit the tip of a screw driver may be formed across the inner hole 1'. The provision of such means proves highly convenient for the handling of the trim cover clip.

What is claimed is:

1. A trim cover clip of a plastic formed in a mold comprising a hollow tube, containing in the wall of said hollow tube at least one slit having the shape of three sides of a rectangle and thereby enclosing therein an engaging piece possessing an attached end and a free end, and having the inner wall of said engaging piece corrugated to form teeth at least some of which are axially spaced from said free end toward adjacency with the attached end, said teeth being capable of engaging with a thread on a bolt being passed through the inner hole of said hollow tube from adjacent the attached end to the free end thereof, said teeth on the inner wall of said engaging piece being helically formed at the same pitch as said thread on said bolt, said engaging piece being formed inwardly aslant relative to the outer wall of said hollow tube so as to have the free end thereof positioned deeply into the inner hole of said tube and substantially completely inwardly of said outer wall for bolt engagement substantially throughout the extent of said engaging piece; and a forming tool accommodating aperture means in the wall of said tube diametrically opposite said engaging piece and at least coextensive with the toothed face of the engaging piece for enabling removal of a part of a tool for forming said engaging piece during molding.

2. A trim cover clip according to claim 1, wherein the inner wall of said engaging piece is curved at the same curvature as the inner wall of said inner hole.

3. A trim cover clip according to claim 1 1 wherein said tube further includes axially and circumferentially spaced thread engaging protuberances fixed to the inner wall of said tube adjacent the edges of said engaging piece and said aperture means in substantially diametric opposition to one another and spaced about ½ pitch of the thread on said bolt.

* * * * *